United States Patent
Kiziltas et al.

(10) Patent No.: US 9,868,835 B1
(45) Date of Patent: Jan. 16, 2018

(54) BIO-BASED POLYURETHANE FOAM MATERIALS INCLUDING GRAPHITE MATERIALS

(71) Applicant: Ford Global Technologies, LLC, Dearborn, MI (US)

(72) Inventors: Alper Kiziltas, Kars (TR); Deborah Frances Mielewski, Ann Arbor, MI (US); Ellen Cheng-chi Lee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/234,367

(22) Filed: Aug. 11, 2016

(51) Int. Cl.
- *C08J 9/00* (2006.01)
- *C08G 18/08* (2006.01)
- *C08G 18/28* (2006.01)
- *C08K 3/04* (2006.01)
- *C08G 101/00* (2006.01)

(52) U.S. Cl.
CPC .......... *C08J 9/008* (2013.01); *C08G 18/0838* (2013.01); *C08G 18/14* (2013.01); *C08G 18/28* (2013.01); *C08K 3/04* (2013.01); *C08G 2101/0008* (2013.01); *C08J 2205/06* (2013.01); *C08J 2375/04* (2013.01)

(58) Field of Classification Search
CPC .... C08G 18/0838; C08G 18/14; C08G 18/28; C08G 2101/0008; C08J 9/008; C08J 2205/06; C08J 2375/04; C08K 3/04
See application file for complete search history.

(56) References Cited

U.S. PATENT DOCUMENTS

| | | | | |
|---|---|---|---|---|
| 5,250,580 A | * | 10/1993 | Parsonage | C08J 9/0066 521/110 |
| 2007/0238798 A1 | * | 10/2007 | McDaniel | C08G 18/246 521/172 |
| 2013/0225705 A1 | * | 8/2013 | Plaver | C08G 18/4841 521/106 |
| 2014/0182063 A1 | | 7/2014 | Crawford et al. | |
| 2014/0272375 A1 | | 9/2014 | Haider et al. | |
| 2016/0107739 A1 | * | 4/2016 | Restuccia | B29C 70/885 428/114 |

FOREIGN PATENT DOCUMENTS

| | | |
|---|---|---|
| CN | 103382244 A | 11/2013 |
| CN | 103408718 A | 11/2013 |
| WO | WO 2014/011293 * | 1/2014 |
| WO | 2014149711 A1 | 9/2014 |

* cited by examiner

*Primary Examiner* — John Cooney
(74) *Attorney, Agent, or Firm* — Maria Johnston; Brooks Kushman P.C.

(57) ABSTRACT

A bio-based polyol-containing polymer foam material, which includes a bio-based polyol-containing polymer foam present in a bulk concentration of the bio-based polymer foam material of 99% by weight or greater; and a graphite material present in a bulk concentration of the bio-based polyol-containing polymer foam material of 1% by weight or less. The bio-based polyol-containing polymer foam material is especially suitable for automotive components having deadening and vibration management features.

20 Claims, 1 Drawing Sheet

BIO-BASED POLYURETHANE FOAM MATERIALS INCLUDING GRAPHITE MATERIALS

TECHNICAL FIELD

This invention relates to bio-based polyurethane foam materials including a graphite material component, and methods of making the same, and to the use of such materials and processes in automotive applications, such as under the hood components and seating components.

BACKGROUND

Polyurethane foam materials are used extensively in automobiles in components for sound deadening and vibration management. Non-limiting examples of such components include seating, headliners and under the hood components, such as engine covers, engine noise insulators, oil pan covers, hood silencers, dashboard silencers, fuel injector encapsulates, underhood lines and side covers. Polyurethane foam materials are formed when an isocyanate groups react with hydroxyl groups. One common method of polyurethane foam production includes the reaction of a polyol having hydroxyl groups and an isocyanate with isocyanate groups to form urethane groups. Additional components are conventionally used in the production of polyurethane foams, such as blowing agents, cross-linking agents and catalysts. A blowing agent can be added to the reaction to cause gas or vapor to be evolved during the reaction. A cross-linking agent promotes chemical cross-linking to form a structured final urethane product. A catalyst can be utilized to control reaction kinetics to help tailor the final product qualities.

Polyols commonly used in the polyurethane foam reaction are typically derived from petrochemicals. Using these types of polyols may have one or more disadvantages. These polyols are derived from a non-renewable resource. Moreover, the production of these types of polyols may expend a relatively high amount of energy, resources and expense. For instance, oil is drilled and extracted and then transported and refined to produce the polyol. Moreover, there are uncertainties associated with the long-term economic stability and limited reserves of fossil fuels and oils.

In light of the potential shortcomings of petroleum-based polyols, there has been an ongoing effort to investigate and utilize bio-based polyols. The bio-based polyols may offer cost advantages and reduce certain environmental concerns associated with petroleum-based polyols. In certain applications, bio-based polyols have been used in the production of polyurethane foams for use in automotive components. Yet, practical hurdles remain to the widespread use of bio-based polyurethane foams in such components.

SUMMARY

In one embodiment, a bio-based polyol-containing polymer foam material is disclosed. The bio-based polyol-containing polymer foam material includes a bio-based polyol-containing polymer foam present in a bulk concentration of the bio-based polymer foam material of 99% by weight or greater; and a graphite material present in a bulk concentration of the bio-based polyol-containing polymer foam material of 1% by weight or less.

In another embodiment, a bio-based polyurethane foam is disclosed. The bio-based polyurethane foam is the reaction product of an isocyanate-reactive component including a bio-based containing polyol, an isocyanate component including an isocyanate-containing compound, and a graphite material present in a bulk concentration of 1% by weight or less. The bio-based polyurethane foam has a density in the range of 20-95 kg/m$^3$, a wet compression set in the range of 5-50%, a tear resistance 200-350 N/m, and/or a modulus in the range of 50-120 kPa.

In yet another embodiment, a method for forming a bio-based polyurethane foam is disclosed. The method includes the steps of mixing a bio-based polyol with a petroleum-based polyol to obtain a bio-based polyol mixture, adding a graphite material to the bio-based polyol mixture to obtain a bio-based polyol-graphite mixture, and adding an isocyanate containing material to the bio-based polyol-graphite mixture to obtain a bio-based polyurethane foam mixture

DETAILED DESCRIPTION

Figure 1:
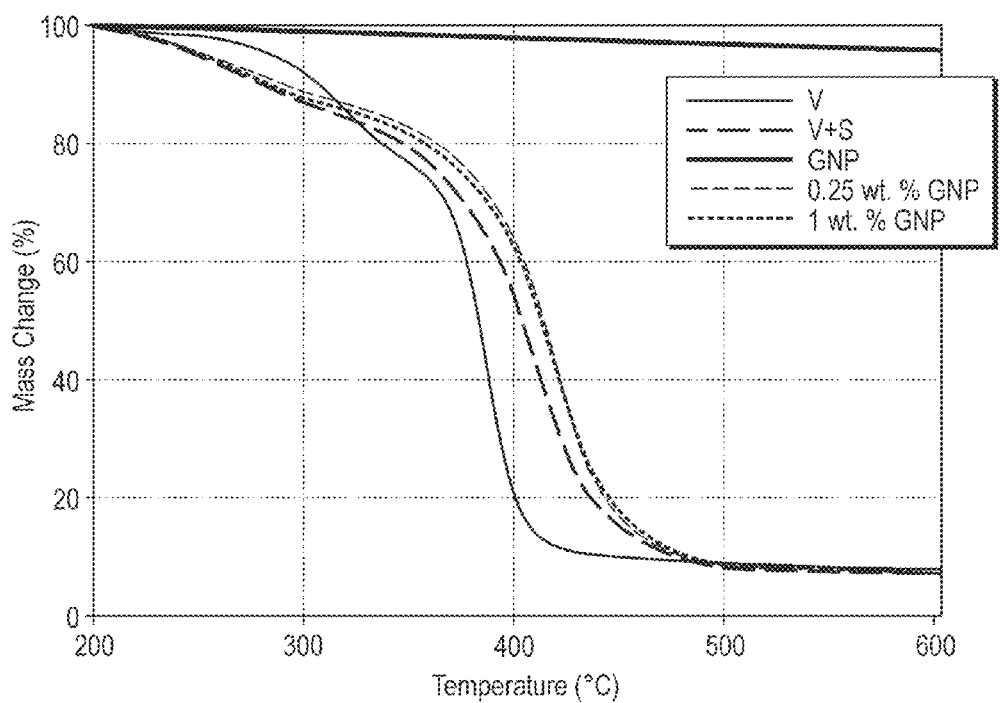
FIG. 1 shows the thermal stability of different flexible polyurethane foams (PUFs) as mass change (%) as a function of temperature (° C.).

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except as otherwise expressly indicated, all numerical quantities in this description indicating amounts of material are to be understood as modified by the word "about" in describing the broadest scope of the invention.

Also, unless expressly stated to the contrary, percent, "parts of," and ratio values are by weight. The term "polymer" includes "oligomer," "copolymer," "terpolymer," and the like. The description of a group or class of materials as suitable or preferred for a given purpose in connection with at least one aspect of the invention implies that mixtures of any two or more of the members of the group or class are equally suitable. The description of constituents in chemical terms refers to the constituents at the time of addition of any combination specified in the description, and does not necessarily preclude chemical interactions among constituents of a mixture once mixed. The first definition of an acronym or other abbreviation applies to all subsequent uses herein of the same abbreviation and applies mutatis mutandis to normal grammatical variations of the initially defined abbreviation.

Polyurethane foam materials are used extensively in automobiles in components for sound deadening and vibration management. Non-limiting examples of such components include seating, headliners and under the hood components, such as engine covers, engine noise insulators, oil pan covers, hood silencers, dashboard silencers, fuel injector encapsulates, underhood lines and side covers. Polyurethane foam materials are formed when an isocyanate groups react with hydroxyl groups. One common method of polyurethane foam production includes the reaction of a polyol having hydroxyl groups and an isocyanate with isocyanate groups to form urethane groups. Additional components are conventionally used in the production of polyurethane foams, such as blowing agents, cross-linking agents and catalysts. A blowing agent can be added to the reaction to cause gas or vapor to be evolved during the reaction. A cross-linking agent promotes chemical cross-linking to form a structured final urethane product. A catalyst can be utilized to control reaction kinetics to help tailor the final product qualities.

Polyols commonly used in the polyurethane foam reaction are typically derived from petrochemicals. Using these types of polyols may have one or more disadvantages. These polyols are derived from a non-renewable resource. Moreover, the production of these types of polyols may expend a relatively high amount of energy, resources and expense. For instance, oil is drilled and extracted and then transported and refined to produce the polyol. Moreover, there are uncertainties associated with the long-term economic stability and limited reserves of fossil fuels and oils.

In light of the potential shortcomings of petroleum-based polyols, there has been an ongoing effort to investigate and utilize bio-based polyols. The bio-based polyols may offer cost advantages and reduce certain environmental concerns associated with petroleum-based polyols. In certain applications, bio-based polyols have been used in the production of polyurethane foams for use in automotive components. Yet, practical hurdles remain to the widespread use of bio-based polyurethane foams in such components.

While bio-based polyurethane foams have been utilized for certain automotive applications and components, such foams remain unsuitable for certain automotive applications and components because the foams may not meet the stringent set of performance characteristics for automotive applications. One such issue is that certain bio-based polymer foams may not have the requisite strength necessary for automotive uses. Adding certain graphite materials to bio-based polyurethane foams enhances the strength of the finished product and otherwise enhances the characteristics of the resulting product to make it suitable for automotive applications and components.

One embodiment includes a bio-based polymer foam composite material including a bio-based polymer foam material and a graphite material. The bio-based polymer foam material may be synthesized through a reaction of an isocyanate material and a bio-based polyol material.

Non-limiting examples of part A isocyanate materials include methylene diphenyl diisocyanate (MDI), toluene diisocyanate (TDI), hexamethylene diisocyanate (HDI), isophorone diisocyanate (IPDI), 4,4'-diisocyanatodicyclohexylmethane (H12MDI), 1,5-naphthalenediisocyanate (NDI), tetramethyllxylenediisocyanate (TMXDI), p-phenylenediisocyanate (PPDI), 1,4-cyclohexane diisocyanate (CDI), tolidine diisocyanate (TODI), and combinations thereof.

Non-limiting examples of part B bio-based polyol materials include those derived from bio-based oils, such as, vegetable or seed oils, soy bean oil, rapeseed oil, canola oil, peanut oil, cotton seed oil, sunflower oil, olive oil, grape seed oil, linseed oil, castor oil, fish oils, algal oils, mustard seed oils, oils derived from animal fats, sugars (sorbitol and sucrose), polyols made from the bio-based diols 1,3-propanediol (PDO) and 1,4-butanediol (BDO) and diacids, including succinic acid and larger acids such as Elevance's Inherent C18 octadecanedioic acid (ODDA), as well as those produced using carbon dioxide ($CO_2$) and combinations thereof.

Non-limiting examples of the resulting bio-based polyurethanes from bio-based oils include flexible foams, which can have an open, partially open and closed cell structure, coatings, elastomers and adhesives. Non-limiting examples of graphite materials include graphite, graphene oxide, graphene nano-platelets (GNP), exfoliated GNP, powdered graphite, vein or lump graphite, amorphous graphite, natural flake graphite, graphene, synthetic graphite, graphite-based particulates, and combinations thereof. Other performance modifiers may be optionally incorporated into the bio-based polymer foam composite material.

In one embodiment, the bio-based polymer foam composite material includes a bulk concentration of the graphite material of 0.25%, 0.50%, or 1.0% by weight of the graphite material and a bulk concentration of the bio-based polymer foam material of 99.0%, 99.50% or 99.75% by weight. The bio-based polymer foam composite material may include 10%, 20%, 30%, 40% or 50% by weight of bio-based polyol, with the balance being a petroleum-based polyol.

As described above, the graphite material can be GNP, which has a relatively high surface area and surface energy. Because of these characteristics, GNP tends to agglomerate and increase its viscosity. These attributes make it difficult to disperse GNP into a polymer matrix without sacrificing the performance characteristics of the polymer matrix. Through experimentation, it has been found that an improvement in the polymer foam properties can be achieved by using 1.0% or less by weight of the GNP. According to some of the experimentation, the GNP used has a surface area of 120 to 150 $m^2/g$ and average particle diameters of 4, 5 or 6 microns, or any range selected from two of these values.

Flexible polyurethane foams (PUFs) were prepared following a one-shot method. This procedure included mixing of certain amounts of polyols (e.g., soy-based polyol (50%) and petroleum based polyols (50%)), surfactant, catalysts, crosslinking and blowing agent at 1,500 rpm for 3 minutes. For the preparation of the GNP reinforced flexible PUF, GNP (0.25%, 0.50% or 1.0 wt. % of the total weight of polyols and MDI) was added and mixed with the polyols. Polymeric methylene diphenyl diisocyanate (MDI) was then added with stirring at 1,500 rpm for 12 seconds. A steel mold is heated inside an oven to about 80° C. prior to pouring the mixture. Then, the mixture was poured in the mold and is kept in the mold 6 minutes. After demolding, sample transferred to an oven at 80° C. for 1 hour for curing. The sample PUFs were taken out from the mold for sample preparation according to ASTM D 3574-11.

Using the above-identified experimental process, a bio-based polymer foam material was synthesized without the addition of a graphite material and with the addition of a graphite material according to the above-identified process. The bio-based polymer foam material without and with the graphite material had the following mechanical, physical and thermal properties. Column "V" includes the property values for a 100% by weight petroleum based polyol. Column "V+S" includes the property values for a mixture of 50% by weight petroleum based polyol and 50% by weight soy-based polyol. The last three columns reflect the property values for "V+S" and the addition of 0.25, 0.50 and 1.0% by weight of GNP. The parenthetical numbers indicate the standard deviation of each property value.

| Property | V | V + S | 0.25% GNP | 0.50% GNP | 1.0% GNP |
|---|---|---|---|---|---|
| Density (kg/m$^3$) | 44.1 | 42.2 | 46.9 | 45.4 | 48.6 |
|  | (1.2) | (1.9) | (0.7) | (1.8) | (0.4) |
| Wet Heat Aging | 24.1 | 34.6 | 37.9 | 37.1 | 32.8 |
| (Wet Compression Set) (%) | (1.9) | (0.8) | (2.4) | (2.1) | (1.8) |
| Tensile Stress at | 120.0 | 84.1 | 98.3 | 71.2 | 92.4 |
| Maximum Load (kPa) | (9.8) | (7.3) | (3.7) | (8.1) | (7.5) |
| Tensile Modulus (kPa) | 184.0 | 185.0 | 160.0 | 204.8 | 185.6 |
|  | (20.0) | (10.0) | (20.5) | (30.5) | (18.1) |
| Tear Resistance (N/m) | 513.9 | 458.2 | 474.5 | 425.8 | 540 |
|  | (38.5) | (28.9) | (42.2) | (30.9) | (38.3) |
| Extension at Maximum | 114.9 | 80.6 | 98.7 | 64.0 | 87.9 |
| Load (mm) | (6.9) | (8.9) | (2.5) | (6.6) | (6.5) |

As shown, certain properties identified in the table are enhanced by the addition of 0.25, 0.50 and 1.0% by weight of GNP. In one embodiment, a density of 42 kg/m$^3$ or greater, a wet compression set of greater than 34%, a tensile stress at maximum load of 84 kPa or greater, a tensile modulus of 185.0 kPa or greater, a tear resistance of 458 N/m or greater and/or an extension at maximum load of 80 mm or greater is achieved by the introduction of GNP in relatively low amounts to a mixture of 50% by weight petroleum based polyol and 50% by weight soy-based polyol.

Moreover, the introduction of GNP in relatively low amounts enhances the thermal stability of the resulting PUF. FIG. 1 shows the thermal stability of different PUFs as mass change (%) as a function of temperature (° C.). The GNP acts as a thermal insulator without detrimentally affecting the mechanical, physical and thermal properties of the resulting PUF, and in fact, these properties are enhanced by the addition of GNP.

Figure 2A:
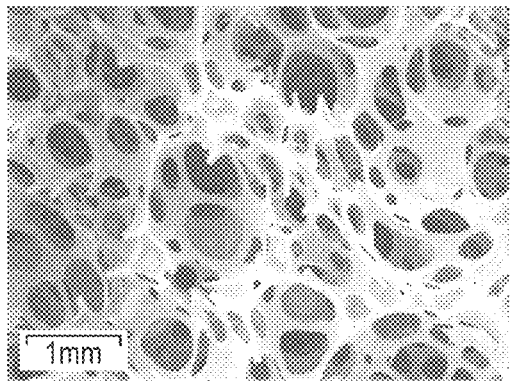
FIGS. 2A and 2B depict microscopic images of the cell structure of a PUF including a mixture of 50% by weight petroleum based polyol and 50% by weight soy-based polyol and a PUF including 49.5% by weight petroleum based polyol, 49.5% by weight soy-based polyol, and 1% graphene nano-platelets (GNP) PUF, respectively.
Figure 2B:
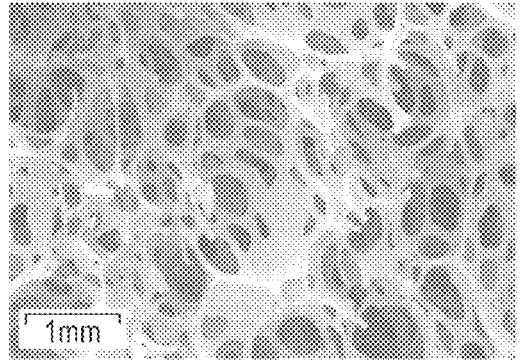

FIGS. 2A and 2B depict microscopic images of a "V+S" PUF and a 1% GNP PUF, respectively. As shown, when GNP is introduced, it was observed that the foam cell number increased and the foam cell size decreased. The foam cell size of the "V+S" PUF may be 200-600 microns. In one example, the foam cell size of the 1% GNP PUF may be 200 microns or less. A fine dispersion of the GNP was exhibited in the PUF matrix.

In one application herein, the bio-based polymer foam composite material is molded into automotive components. The molding may be performed in-situ during synthesis of the bio-based polymer foam composite material. Non-limiting examples of automotive components that may be partially or entirely fabricated from the bio-based polymer foam composite material include under the hood components (e.g., engine covers, engine noise insulators, oil pan covers, hood silencers, dashboard silencers, fuel injector encapsulates, underhood lines and side covers) and seating components (e.g., seat cushions, seat backs, armrests and head restraints)

Certain mechanical, physical and thermal properties of polymer foam materials may be suitable for the above-identified automotive applications. The following is a non-exhaustive list of such properties and typical ranges that are suitable for automotive applications: density for seat cushions and backs should be in the range of 20-95 kg/m$^3$. Wet compression set for seat applications (cushions and backs) and underbody thermal and/or sound absorbing insulators should be in the range of 5-30 and 50%, respectively. Tear resistance for seat applications (cushions and backs) and underbody thermal and/or sound absorbing insulators should be in the range of 200-350 and 250 N/m, respectively. Modulus for seat cushions and backs should be in the range of 50-120 kPa.

In certain known applications, petroleum-based polymer foam materials are utilized because they meet one or more of the suitable property values as identified above. Petroleum-based foam polymers tax the environment, and the automotive industry has looked to bio-based polymer foams as an alternative to petroleum-based foam polymer material. Conventional bio-based polymer foam materials may fail to meet the suitable performance values for use in the automotive industry. Advantageously, as shown above, the inventors have found that the addition of a relatively low concentration of graphite material to the bio-based polymer foam material provides a bio-based polymer foam composite material meeting one or more of the suitable mechanical, physical and tensile properties for automotive applications.

In one embodiment, the graphite material is homogeneously dispersed through the bio-based polymer foam composite material. In such embodiments, the concentration of the graphite material in any localized region of the bio-based polymer foam composite material does not exceed the bulk concentration of the graphite material by more than 10%, 5%, 2% or 1%. In an alternative embodiment, the bio-based polymer foam has one or more localized regions in which the localized concentration of the graphite material exceeds the bulk concentration by more than 10%, 20% or 50%. As a non-limiting example, the one or more localized region could be a surface region of a formed (e.g., molded) bio-based polymer foam composite in which the surface region requires additional strength.

In one or more embodiments, the polymer foam (isocyanates and polyols) accounts for 99-99.75% by weight and the GNP accounts for 0.25-1.0% by weight. GNP provides a PUF with valuable compensation for the declined mechanical properties, which were introduced by high amount of bio-based polyols. Fine dispersion of GNP was observed in PU matrix. Better physical and mechanical properties were achieved with less than 0.5% by weight GNPs in the PU structure showing the importance of nanocomposites. With increasing of GNP concentration thermal stability was enhanced, because GNP acted as a thermal insulator. The higher tensile stress for PU nano-foams was obtained with 0.25% by weight concentration due to good interaction of isocyanates and GNP. One or more embodiments a cost equivalent and favorable alternative of petroleum derived foams and this technology directly supports the automotive industry, and the outcome has a direct impact on under the hood and seating applications.

The appended claims are not limited to express and particular compounds, compositions, or methods described in the detailed description, which may vary between particular embodiments which fall within the scope of the appended claims. Further, any ranges and subranges relied upon in describing various embodiments of the instant disclosure independently and collectively fall within the scope of the appended claims, and are understood to describe and contemplate all ranges including whole and/or fractional value therein, even if such values are not expressly written herein. One of skill in the art readily recognizes that the enumerated ranges and subranges sufficiently describe and enable various embodiments of the instant disclosure, and such ranges and subranges sufficiently describe and enable various embodiments of the instant disclosure, and such ranges and subranges may be further delineated into relevant halves, thirds, quarters, fifths, and so on.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A bio-based polyol-containing polymer foam material comprising:
    a bio-based polyol-containing polymer foam present in a bulk concentration of the bio-based polymer foam material of 99% by weight or greater; and
    a graphite nano-platelet (GNP) material present in a bulk concentration of the bio-based polyol-containing polymer foam material of 1% by weight or less and having a surface area of 120 to 150 m$^2$/g.

2. The bio-based polyol-containing polymer foam material of claim 1, wherein the GNP material has an average particle diameter of 4 to 6 microns.

3. The bio-based polyol-containing polymer foam material of claim 1, wherein the GNP material is finely dispersed within the bio-based polyol-containing polymer foam.

4. The bio-based polyol-containing polymer foam material of claim 1, wherein the GNP material present in a bulk concentration of the bio-based polyol-containing polymer foam material is of 0.5%.

5. The bio-based polyol-containing polymer foam material of claim 1, wherein the GNP material present in a bulk concentration of the bio-based polyol-containing polymer foam material is of 0.25%.

6. The bio-based polyol-containing polymer foam material of claim 1, wherein the bio-based polyol-containing polymer foam is a mixture of 50% by weight petroleum based polyol and 50% by weight bio-based polyol.

7. The bio-based polyol-containing polymer foam material of claim 1, wherein the bio-based polyol-containing polymer foam is a flexible foam.

8. A bio-based polyurethane foam comprising the reaction product of:
    a bio-based containing polyol;
    an isocyanate-containing compound; and
    a graphite nano-platelet (GNP) material present in a bulk concentration of 1% by weight or less and having a surface area of 120 to 150 m$^2$/g,
    the bio-based polyurethane foam having a density in the range of 20-95 kg/m$^3$, a wet compression set in the range of 5-50%, a tear resistance 200-350 N/m, and/or a tensile modulus in the range of 50-120 kPa.

9. The bio-based polyurethane foam of claim 8, wherein the GNP material has an average particle diameter of 4 to 6 microns.

10. The bio-based polyurethane foam of claim 8, wherein the GNP material is finely dispersed within the bio-based polyurethane foam.

11. The bio-based polyurethane foam of claim 8, wherein the GNP material is present in a bulk concentration of the bio-based polyurethane foam of 0.5%.

12. The bio-based polyurethane foam of claim 8, wherein the GNP material is present in a bulk concentration of the bio-based polyurethane foam of 0.25%.

13. The bio-based polyurethane foam of claim 8, wherein a ratio of a petroleum based polyol to a bio-based polyol in the bio-based polyurethane foam is in the range of 2:1 to 1:2.

14. The bio-based polyurethane foam of claim 8, wherein the bio-based polyurethane foam is a flexible foam.

15. A method for forming a bio-based polyurethane foam comprising the steps of:
    mixing a bio-based polyol with a petroleum-based polyol to obtain a bio-based polyol mixture;
    adding a graphite nano-platelet (GNP) material having a surface area of 120 to 150 m$^2$/g to the bio-based polyol mixture to obtain a bio-based polyol-graphite mixture; and
    adding an isocyanate containing material to the bio-based polyol-graphite mixture to obtain a bio-based polyurethane foam mixture.

16. The method of claim 15, wherein the GNP material is present in the bio-based polyol-graphite mixture in a weight percent of 1.0 or less.

17. The method of claim 15, wherein the GNP material has an average particle diameter of 4 to 6 microns.

18. The method of claim 15, wherein the GNP material adding step includes dispersing the graphite material into the bio-based polyol mixture to obtain the bio-based polyol-graphite mixture.

19. The method of claim 15, further comprising curing the bio-based polyurethane foam mixture to obtain a bio-based polyurethane foam.

20. The method of claim 15, wherein the bio-based polyurethane foam is the flexible bio-based polyurethane foam.

* * * * *